United States Patent [19]
Christy et al.

[11] Patent Number: 5,450,478
[45] Date of Patent: Sep. 12, 1995

[54] REMOTELY PROGRAMMABLE EQUIPMENT MONITORING TELEPHONE LINE PROTOCOL

[75] Inventors: Theresa M. Christy, West Hartford; Brian F. Beloin; Barry G. Blackaby, both of Avon, all of Conn.; Michael E. Dickinson, West Lebanon, N.H.

[73] Assignee: Otis Elevator Company, Farmington, Conn.

[21] Appl. No.: 272,954

[22] Filed: Jul. 8, 1994

Related U.S. Application Data

[63] Continuation of Ser. No. 997,998, Dec. 28, 1992, abandoned.

[51] Int. Cl.⁶ ............................................. H04M 11/00
[52] U.S. Cl. ........................................ 379/98; 379/102; 379/106
[58] Field of Search .......................... 379/37–51, 379/93, 94, 96, 97, 98, 102, 104, 105, 106, 107; 340/870.02; 187/139, 140

[56] References Cited

U.S. PATENT DOCUMENTS

| | | | |
|---|---|---|---|
| 4,394,540 | 7/1983 | Willis et al. | 379/106 |
| 4,431,086 | 2/1984 | Moser et al. | 379/105 |
| 4,622,538 | 11/1986 | Whynacht et al. | 340/506 |
| 4,654,868 | 3/1987 | Shelley | 379/106 |
| 4,697,243 | 9/1987 | Moore et al. | 379/95 |
| 4,703,325 | 10/1987 | Chamberlin et al. | 379/39 |
| 5,025,470 | 6/1991 | Thornborough et al. | 340/870.02 |
| 5,202,916 | 4/1993 | Oliver | 379/106 |
| 5,204,896 | 4/1993 | Oliver | 379/106 |
| 5,235,634 | 8/1993 | Oliver | 379/106 |
| 5,239,575 | 8/1993 | White et al. | 340/870.02 |

*Primary Examiner*—Curtis Kuntz
*Assistant Examiner*—Jason Chan

[57] ABSTRACT

A master data processor (18) may send data indicative of equipment condition through a modem (24) to a modem (26) of a data processor (28) in a local monitoring center (over telephone lines) whenever they occur in response to a seize mode (59) or between established times of day (64, 68, 69), or whenever the telephone line becomes free (65)if the data messages amount to alarm conditions (65). Calls can be received at the local monitoring center 14 between said preestablished times (79–82) after a predetermined number of rings (83, 85).

7 Claims, 4 Drawing Sheets

REMOTELY PROGRAMMABLE EQUIPMENT MONITORING TELEPHONE LINE PROTOCOL

This is a continuation of application Ser. No. 07/997,998, filed Dec. 28, 1992, now abandoned.

TECHNICAL FIELD

This invention relates to selective sharing of telephone lines between voice and data use, with options ranging from dedicated data use to nearly dedicated voice use, and remote definition of the protocols therefor.

BACKGROUND ART

It is well known to utilize remote elevator monitoring systems (REMs) for monitoring operating conditions in individual elevators in widely diverse locations. Examples of such a system are described in U.S. Pat. No. 4,568,909 and 4,622,538, briefly illustrated in FIG. 1 herein. Each monitors individual elevators in remotely located buildings 12 (therein referred to as REM buildings), transmits alarm and performance information to associated local monitoring centers 14, and retransmits the alarm and performance information from the local centers to a central monitoring center 16, the purposes of which are fully set forth in the aforementioned patents and not germane herein. Each of the buildings 12 includes a master data processing system 18 and one or more slave data processing units 20 which together gather significant information about corresponding elevators and elevator shafts. The slaves 20 communicate with the master over lines 22, which permits locating the master 18 in an environment within the building which is less severe than the elevator machine rooms. Each master 18 communicates through a modem 24 and over ordinary community telephone lines to a modem 26 within the local monitoring center 14. The modem 26 exchanges information with a local data processor 28, which informs service personnel of conditions in all of the associated elevators being monitored, by means of displays (not shown) and/or a printer 30.

The REMS of the type described in said patents have evolved with increasing sophistication and have found widespread use. The value of them includes being able to provide alarms quickly for response by local service personnel, as well as providing other information indicative of impending degradation of the elevator system or potential harm or inconvenience to the passengers (referred to herein as "alerts"). And such systems allow the transfer of significantly more information, to assist in diagnosing the total situation so that a correct response can be made.

The local monitoring centers 14 typically service buildings of a small city, or of a particular sector of a large city, which is suited to the capability of service personnel to handle required calls indicated thereby. Since a local monitoring center 14 can be connected over ordinary phone lines to literally any building in its area, the services afforded thereby are readily available to all of the buildings in the area, subject to the availability of suitable phone lines.

In the usual case, the modem 24 in each building 12 is connected to its own, dedicated phone line over which it will communicate with the modem 26 of the local monitoring center 14. Some service customers deem the dedication of a phone line to the relatively infrequent use of an elevator monitoring system as being too extravagant. In some locations, particularly in countries other than the United States, phone lines are not only extremely expensive, but difficult to obtain, requiring extremely long waiting times for assignment of a line. The significant advantages of a REMS is therefore lost for want of a phone line.

DISCLOSURE OF INVENTION

Objects of the invention include provision of phone service for remote equipment monitoring which is universally selectable to operate with minimum interference to voice use of the same telephone line, in which the parameters for sharing the line with voice use can be established at the local monitoring center and transmitted over the controlled telephone line to the building master, and which is readily configured to take advantage of a dedicated phone line, when one is available.

According to the invention, computer monitoring in a building can be configured to seize a telephone line whenever it has a message to send to another computer in a local monitoring center.

According further to the present invention, the time of day and number of rings of a telephone call incoming to a remotely located equipment monitoring system, determine whether or not the system will answer the call and receive data therefrom. According still further to the invention, such parameters are adjustable within the remotely located equipment monitoring master by controlling commands provided thereto over the same telephone line from a local monitoring center. According to the invention still further, such commands can control use of the telephone line to transmit alarms and alerts to the local monitoring center, or the equivalent monitoring system master can be configured to treat the telephone line as dedicated solely to it.

The present invention allows use of the same equipment with either shared or dedicated telephone lines. The invention permits altering the conditions under which telephone lines are shared between voice and remote equipment monitoring systems by means of remotely generated commands transmitted thereto over those same telephone lines. The invention provides protocols which can be selectively different for outgoing alarms and alerts than for incoming data transmissions. The invention makes it possible for remote equipment monitoring in areas where acquisition and/or maintenance of dedicated telephone lines is either difficult or unduly burdensome. The invention may be used for monitoring elevators, or for monitoring other equipment.

Other objects, features and advantages of the present invention will become more apparent in the light of the following detailed description of exemplary embodiments thereof, as illustrated in the accompanying drawing.

BEST MODE FOR CARRYING OUT THE INVENTION

Figure 1:
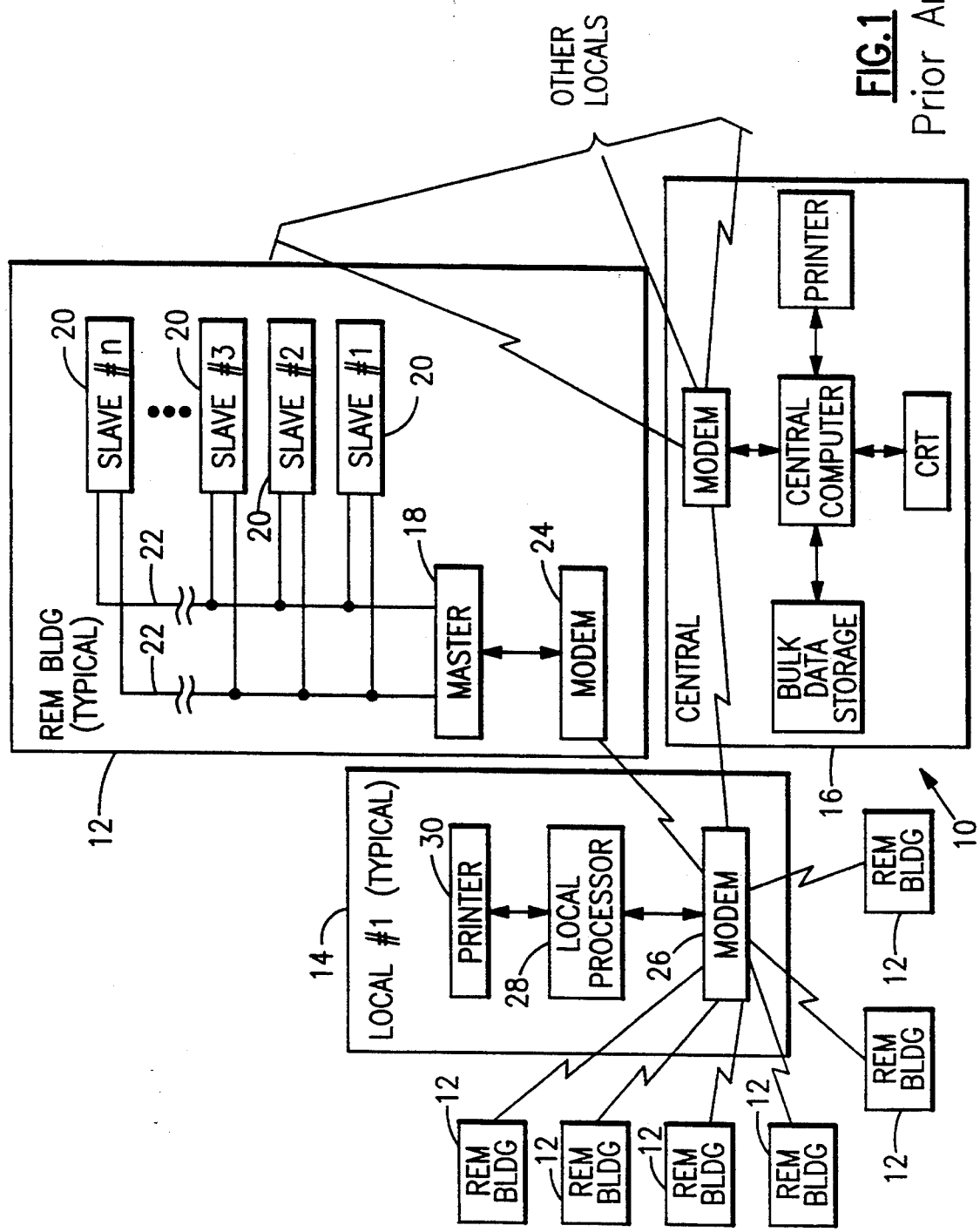
FIG. 1 is a simplified schematic block diagram of a remote elevator monitoring system in accordance with the prior art.
Figure 2:
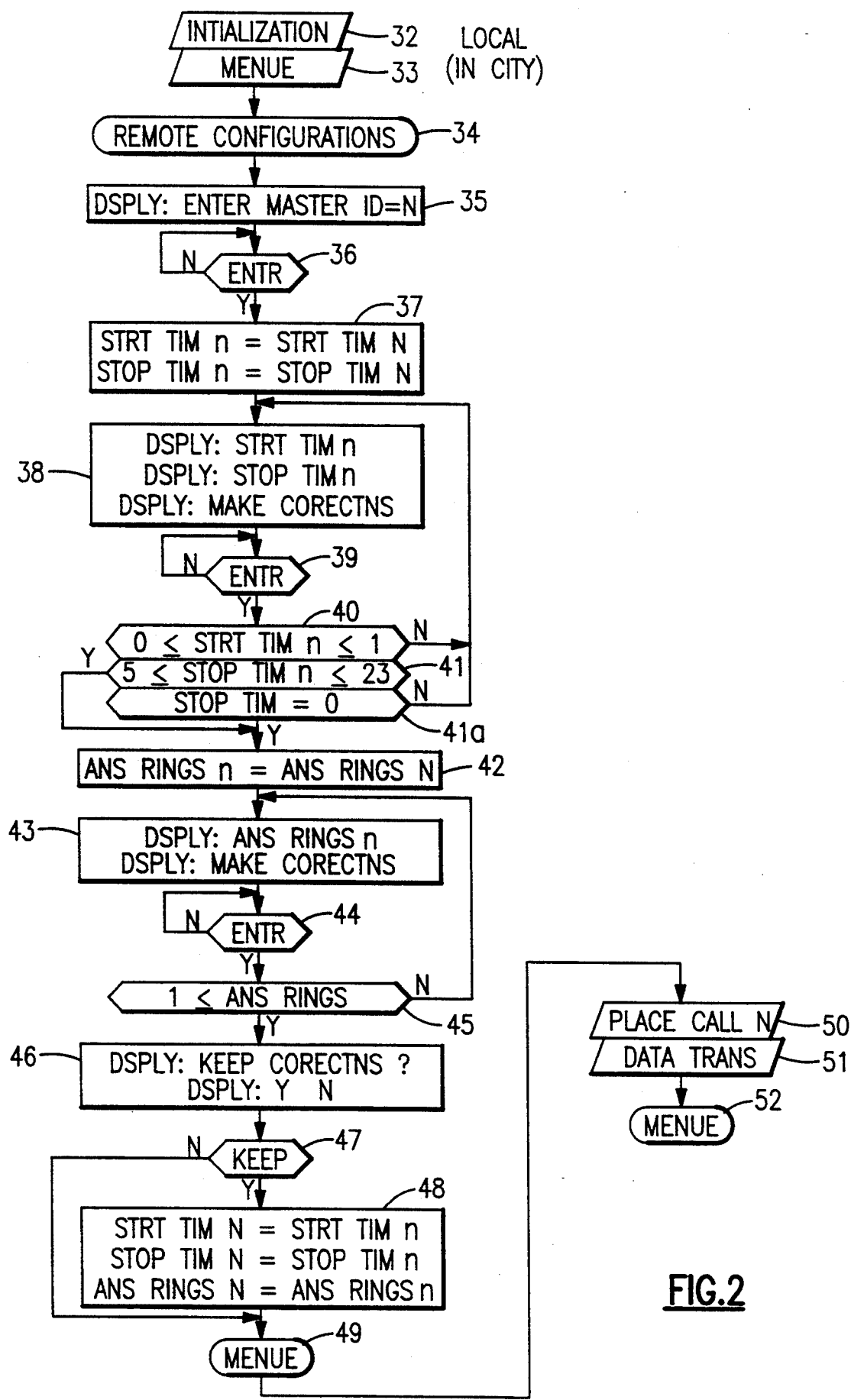
FIG. 2 is a logic flow diagram of a remote configurations routine within the data processor of a local monitoring center.

Referring now to FIG. 2, the local processor 28 (FIG. 1) in the local monitoring center 14 has a program which begins with the normal power up initialization steps which may be in a subroutine 32, and then advances to a menu subroutine 33 which allows the operator to select the task to be performed. One such task is to establish the configurations in the remotely located master data processors 18 within the buildings being served in the area. A routine for handling remote configurations is reached through an entry point 34 and a first step 35 causes a display to request the operator to enter the ID number, N, of the master data processor 18, the telephone configuration of which is to be examined and possibly altered. If desired, the operator could enter the ID number of slave 20 and the program could look up the number of the related master. This could facilitate responding to messages from slaves identified to the operator as such. When the operator enters the ID number and presses enter, an affirmative result of a test 36 will reach a pair of steps 37 establishing a temporary working value of a new start time, the time after which, within any day, the master is allowed to answer phone calls and place low priority calls for transferring alerts, and a temporary working value of a new stop time, the time after which such calls can no longer be made. In a pair of steps 37, a temporary new value of start time and a temporary new value of stop time are made equal to the values of start time and stop time previously established for the master whose ID is N. Then in a group of steps 38, these values are displayed along with an admonition to the operator to make corrections therein. The program waits until the operator presses the enter key, without corrections if the previously established start time and stop time are acceptable, or after correcting the start time or the stop time, if desired. When finished, an affirmative result of a test 39 will reach a pair of tests 40-41a where the span of time between the start time and stop time is determined not only to be between 0 and 23 (which may in reality be 23.99) but also to ensure that the span of time includes 1 am through 5 am, or such other time as any implementation of the present invention may suitably use to ensure that there is a time period when communications may be had between the local monitoring center and the building master, which is least likely to interfere with voice communications on the line. If the protocol is not properly followed, a negative result of test 40 will cause the established start time and stop time to again be displayed by the steps 38, and the operator is again admonished to make corrections therein. If the start time is OK, a test 41 determines if the stop time is between 5 am and midnight. If not, a test 41a determines if the stop time is zero, because in this embodiment, a stop time of zero means calls can be answered up to midnight. If not, test 41a reverts to steps 38. Assuming that the start and stop time are finally established and include the time frame 1 am through 5 am, an affirmative result of either test 41 or test 41a will reach a step 42 where for similar purposes, a temporary new value of answer rings, the number of rings before the building master 18 will answer the phone, is set equal to the number of answer rings previously established for the master with the ID of N. Then, a pair of steps 43 display the number of answer rings and admonish the operator to make corrections therein. When the corrections (if any) are complete, the operator will press enter and an affirmative result of a test 44 will reach a test 45 to determine if the number of rings is between one and ten. If not, the process will repeat through the step 43 and test 44. Eventually, when the number of rings is set between one and ten, an affirmative result of the test 45 will reach steps 46 where the operator is asked if the corrections should be kept or discarded, together with a Y/N prompt. Upon the pressing of Y or N, a test 47 will either reach or skip a series of steps 48 where the start time, stop time and answer rings for the building master 18 having an ID of N is set equal to the new values thereof (n). Then the program reverts to the menu through a transfer point 49 for the operator to pick a task. One task is to send the configurations to the master 18. A subroutine 50 will cause the modem 26 to place a telephone call to the modem 24 of the building master 18 identified by the ID number N. And the configuration (start time, stop time and answer rings) just established will be sent to the building master 18 via a data transmission subroutine 51. Then the menu will be reverted to through a transfer point 52.

Figure 3:
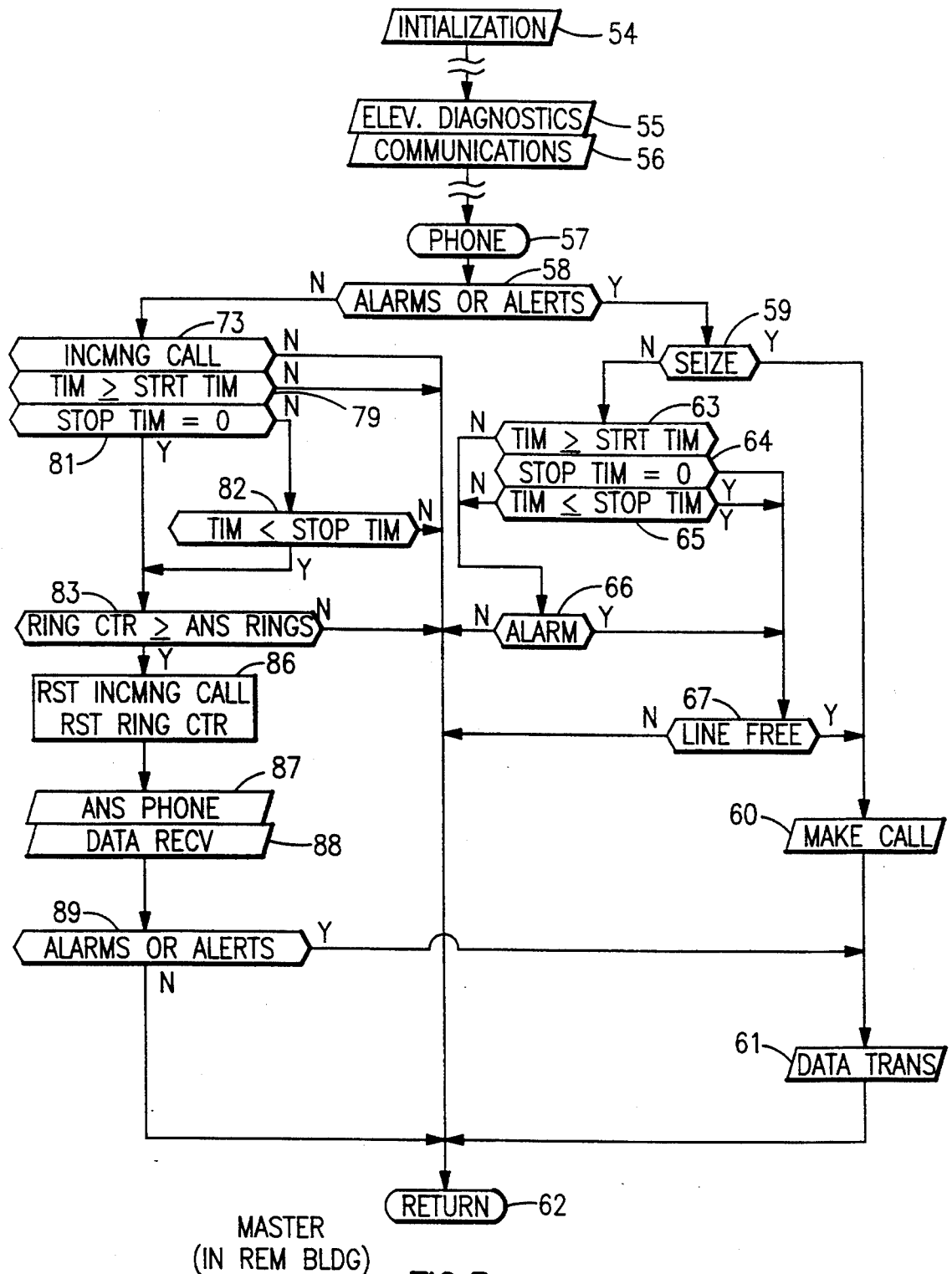
FIG. 3 is a logic flow diagram of a phone routine within the master data processor of a remote equipment monitoring system (such as in a building monitoring elevators)

A program which may be run within the master data processor 18 of a building 12 is illustrated in FIG. 3. Therein, the program may have the usual power up initialization steps or routine 54, and may have a variety of other routines, some of which are not shown, as well as elevator diagnostic routines 55, communications routines 56, and the like. In accordance with the invention, one of the routines is a phone routine which is reached through an entry point 57, periodically, such as every 200 milliseconds or so. The timing simply has to be sufficiently fast so as to be able to handle incoming and outgoing phone calls adequately. A first test 58 determines whether any alarms or alerts are outstanding, which would have been established by running the elevator diagnostics routine 55. If there are, they are in a queue. For purposes of the invention, the difference between alarms or alerts is simply that alarms are deemed to be more urgent and alerts can wait. In elevator systems, examples of alarms are malfunctioning doors and stuck car call buttons, and examples of alerts are excessive deceleration times and controlled shut down due to overtemperature conditions. The routine of FIG. 3 treats outgoing alarms or alerts as having precedence over routine incoming information. The reason is, incoming calls simply have to do with housekeeping between the master data processor 18 and the local data processor 28 within the local monitoring center 14. On the other hand, alarms or alerts contain data relating to passenger safety or inconvenience, and actual or impending failure conditions within the elevator equipment.

Assuming that there is an alarm or an alert registered by the elevator diagnostics routine 55, an affirmative result of the test 58 will reach a test 59 to determine if this particular building master has been placed in a seize mode or not. This is a feature of the present invention in which by means of a jumper, a switch, or the like, selection can be made between a seize mode and a share mode, directly on the master data processor 18, or associated with it in some fashion within the building 12. If the seize mode has been selected, then an affirmative result of the test 59 will reach a subroutine 60 in which the modem 24 is caused to place a call to the modem 26 so as to permit the master data processor 18 to run a data transfer routine 61 and transfer the information relating to the alarm or the alert to the local processor 28 within the local monitoring center 14. Then the program reverts to other routines through a return point 62. In this fashion, when the seize option has been selected, outgoing alarms and alerts are transmitted over the telephone line as they occur; this therefore treats the line as a dedicated line, and is a mode in which the master data processor 18 will be placed when a dedicated telephone line is made available to it. It also allows the building manager to essentially switch from a shared mode to an outgoing seize mode for alarms and alerts, without involving the local monitoring center, such as during a period of earthquakes or other emergency.

Assume now that the particular master data processor 18 has not been placed in the seize mode, but instead is in the share mode. A negative result of the test 59 will reach a set of tests 63–65 to determine if the present time of day is within the configured start and stop times. The call time (start time and stop time described with respect to FIG. 2) will always have been configured within this master data processor 18, either because of a data transfer caused by the routine 48 of FIG. 2, or because it is still set to a default start time equal to zero and a default stop time equal to zero. The zero/zero setting is a protocol established herein, as described more fully hereinafter, which has the effect of saying that calls can be sent and received at any time of the day or night. First, a test 63 determines if the present time of day is equal to or later than the start time. If it is not, then no call can be placed for just an alert at this time. However, a negative result of the test 63 will reach a test 66 to see if an alarm has been registered by the routine 55. If it has, an affirmative result of the test 66 will reach a test 67 to determine if the line is free. If voice communications are being had over the line, a call cannot be made, so a negative result of test 67 will cause the program to revert to other tasks through the return point 62. In a subsequent pass through the routine of FIG. 3, the result may be the same, but eventually, the line will become free, and an affirmative result of the test 67 will reach the routines 60, 61 so as to transmit the alarm and any alerts to the local monitoring center 14 through the modems 24, 26. Note that the nature of the program described in FIG. 3 makes it impossible for the step 65 to be reached while data transmission is occurring in the routine 61 (or, as described hereinafter, while data is being received by the master data processor 18 unless it is in the seize mode). This prevents overlapping in attempts to use the telephone lines. It is contemplated to allow sending of any alerts anytime that a call is made to send any alarms; but it need not be so.

If the present time is equal to or later than the start time, an affirmative result of the test 63 will reach the test 64 to determine if the established stop time is set at zero, within the protocol that start and stop times of zero means that calls are always possible. If it is, then calls can be made to transmit alarms or alerts, and an affirmative result of the test 67 will reach the test 66 to determine if the line is free, thereby permitting either alerts alone or alarms or both to be sent when the line is free. On the other hand, if the stop time was not set at zero, then a negative result of the test 64 reaches the test 65 to determine if the present time is nonetheless less than the stop time for permitted calls. If it is, an affirmative result of test 65 reaches the test 67 to determine if the line is free, thereby permitting transmission of alarms and/or alerts. But if the stop time is not set equal to zero and if the current time is later than the established stop time, negative results of both tests 64 and 65 will reach the test 66 to determine if an alarm has to be set, or not. If it has, then an affirmative result of test 66 reaches test 66 to see if the line is free; if not, the program will return through the point 62. There will be subsequent passes through the routine of FIG. 3 until a free line allows transmitting the alarms, if any (along with alerts). But if the reason that test 58 is affirmative is because of an alert but not any alarms, then test 66 will be negative, causing the alert simply to be left queued up to await the time, later in this day or within the next day, when calls will be permitted, or to be transmitted along with an alarm, should one occur. This is possible because the definition of "alert" is that it is information of a sufficiently low priority that it does not have to be sent until its sending will not interfere with use of the telephone line for voice communications. Queuing of the alarms and the alerts simply means retaining the data messages that indicate the nature of the alarm or alert, and the fact of such alerts, so that eventually in some subsequent pass through the routine of FIG. 3, affirmative results of tests 63–65 or 66 as well as test 67 will cause the alarms and/or alerts to be transmitted to the local monitoring center 14.

If there are no alarms or alerts to be sent, then the more mundane reception of communications from the local monitoring center 14 can be attended to. A negative result of test 58 will reach a test 73 to see if there is an incoming call. The fact of an incoming call is established in an incoming call routine described hereinafter with respect to FIG. 4. If there is no incoming call, then the program simply reverts to other routines through the return point 62. In a typical embodiment practicing the present invention, the various routines of the program within the master data processor 18 may be reached repetitively, every 200 milliseconds. In such a case, the test 58 will be reached every 200 milliseconds to see if either any alarm or alert should be dealt with, and if not, to see if there is an incoming phone call to deal with. In the present invention, unless the system is configured to operate in the seize mode with a dedicated telephone line, with start and stop time of zero and ability to answer the first ring, the system must take care not to answer phone calls which may be voice communications, the assumption of which is determined by the number of answer rings and the time of day, as is described with respect to FIG. 2 hereinbefore.

Assuming that an incoming call has been sensed, an affirmative result of the test 73 will reach a test 79 to determine if the present time of day is equal to or greater than the start time so that the phone call can be answered, or not. If the start time has been set to zero, this test will always be affirmative; but if some other call time has been configured, it is possible that the call is coming in prior to the time when the system should answer the call, so a negative result of test 79 will cause other parts of the program of the master data processor 18 to be reverted to through the return point 62. Assuming that the time is equal to or after the start time, an affirmative result of test 79 will reach a test 81 to determine if the stop time is zero. If it is, the call can automatically be answered; but if it is not, it must be determined, in a step 82, whether or not the current time is equal to or less than the stop time, after which no more calls can be answered. If the stop time is not set to zero and the current time is after the stop time, a negative result of test 82 means that the call will not be answered, and the program of the master data processor 18 will revert to other routines through the return point 62. If there is an affirmative result from either step 81 or step 82, the call can be answered, and a test 83 determines if the number of rings which have occurred so far are equal to or greater than the number of answer rings established in the configuration. The default number of rings is two, but the configuration can be set from one to ten, as described with respect to FIG. 2. If the number of answer rings is set to other than one, initially there will be a negative result of the test 83 and the program of the master data processor 18 will revert to other routines through the return point 62. In the usual case, the routine of FIG. 3 may cycle through a few passes of a negative result of test 83 until the desired number of rings have occurred. Then an affirmative result of test 83 will reach a pair of steps 86 (described more fully with respect to FIG. 4) which reset a flag that keeps track of the fact that an incoming call was being received, and reset a counter that counts the number of rings for the purposes just described. Then, a routine 87 will cause the modem 24 to answer the call and the master data processor 18 will receive data over the phone line as a result of a routine 88. Then, a test 89 determines if there are any alarms or alerts to be sent, under the notion that the REM may as well use the line while it is connected. If so, an affirmative result of test 89 reaches the data transmission subroutine 61, to transmit the alarms and/or alerts. But if not, other parts of the program of the master data processor 18 are reverted to through the return point 62.

In the usual case, every 200 milliseconds, the routine of FIG. 3 will be reached and when things are proceeding calmly, a negative result of test 58 will reach a negative result of test 73 and other parts of the program are reached through the return point 62. If any alarm or alert conditions occur, then an affirmative result of test 58 will determine whether an alarm or an alert will be transmitted; on the other hand, as long as there are no alarms or alerts, a negative result of test 58 reaches test 73 to see if an incoming call should be examined to determine if it should be answered or not, depending upon the number of rings and the time of day. If indeed the system is operating with a dedicated phone line, then the routine of FIG. 2 is typically utilized to configure the number of answer rings at one and both the start time and stop time at zero so that any incoming calls will be answered at any time of the day on the first ring, as described with respect to tests and steps 73-86 hereinbefore. Whenever the telephone line must be shared with voice communications, however, the number of rings can be varied anywhere between one and ten, and the starting times can be varied as desired, so long as (in the example of the present embodiment) phone calls can be received between 1 am and 5 am so as to ensure some communication from the local monitoring center 14 to the master data processor 18 in the building 12.

In order to determine when there is an incoming telephone call, and to count the number of rings, a suitable routine may be established, or hardware responses to the conditions of the telephone line may be used, if desired. In the present embodiment, a simple software response to the voltage level on the telephone line is utilized. The voltage level on the telephone line is treated by the software as a discrete signal, which is present during a telephone ring condition, and which is absent during the inter-ring space. The routine of FIG. 4, which is exemplary merely and the use of which is not required by the invention, is entered through a transfer point 90 and a first test 91 determines if the ring condition is present or not. In the usual case, it will not be and a negative result of test 91 will reach a step 92 where a ring flag (described hereinafter) is reset so as to permit counting of the next ring which will occur. Then, a test 93 establishes whether or not the routine has already recognized that there is an incoming call. In the case where there is no call coming in, a negative result of test 93 causes the program of the master data processor 18 to revert to other routines through a return point 95. In the usual case, when no calls are coming in, this routine being reached every 200 milliseconds or so, will simply result in a negative result of test 91, redundantly resetting the ring flag in step 92, and a negative result of test 93 causing it to revert to other programming through the return point 95.

When a call does come in, whether it be a call for voice transmission or data transmission, within or outside of the permissible answering time, an affirmative result of test 91 will reach a pair of steps 96 in which a space flag is reset, which keeps track of inter-ring spaces in the manner described hereinafter, and an incoming call flag is set to remember that a call is coming in. Then a test 97 determines if the ring flag is set or not. In the first sensing of a ring, test 97 will always be negative reaching a pair of steps 98 which increment the ring counter, thereby to keep track of the number of rings for comparison with the number of answer rings (FIG. 3), and set the ring flag so as to remember that this ring has in fact been counted. Then the program of the master data processor 18 reverts to other routines through the return point 95.

Figure 4:
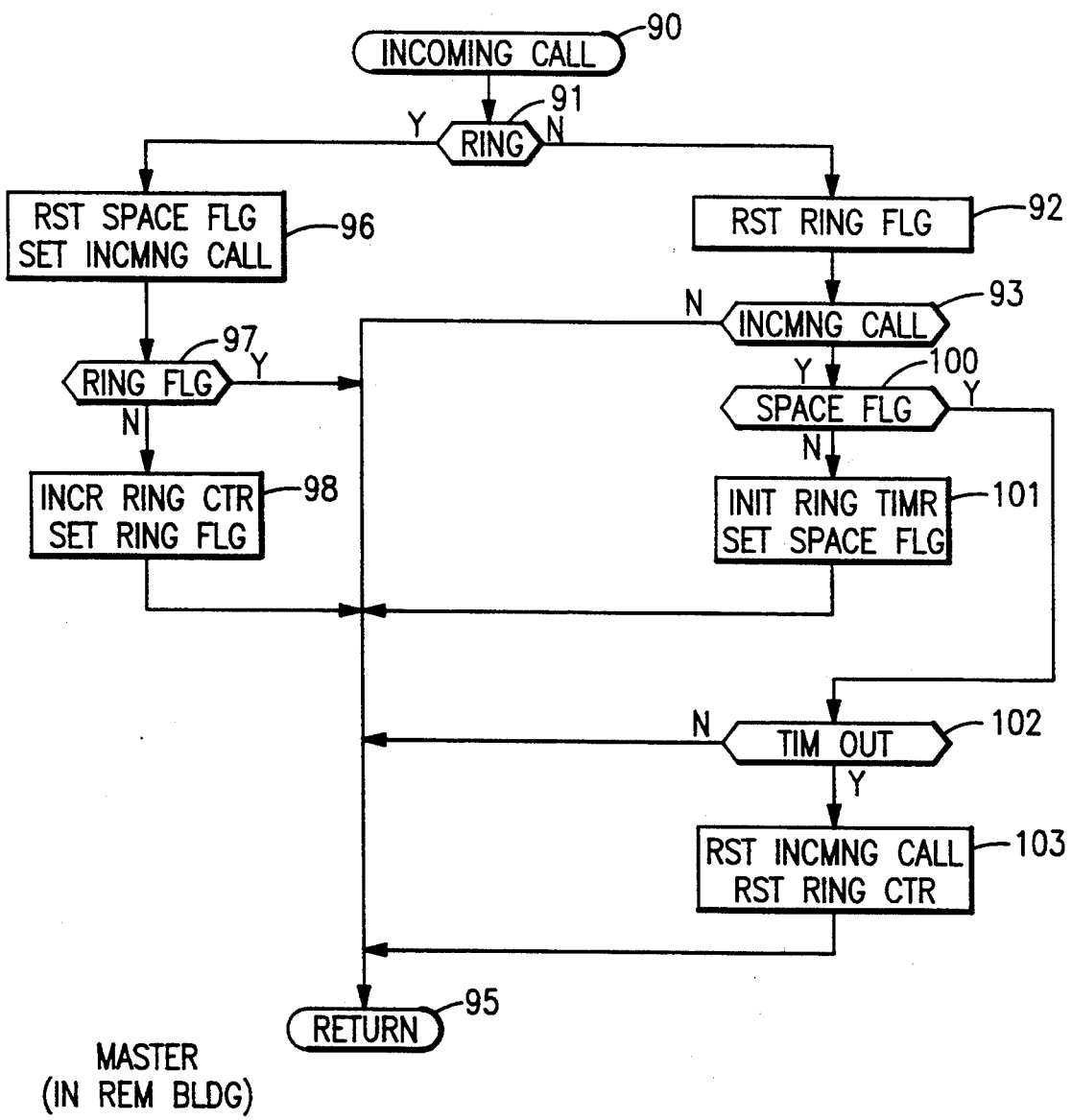
FIG. 4 is a logic flow diagram of an exemplary routine in the master data processor within a remote equipment monitoring system which keeps track of incoming calls and counts the rings thereof, for use with the routine of FIG. 3.

Assuming that the routine of FIG. 4 will be reached about every 200 milliseconds, that means it will actually be reached between 10 and 15 times during every ring, assuming that the rings are between 2 and 3 seconds long, which is typical. Therefore, the next time that the routine of FIG. 4 passes through the test 91, it will be affirmative, but it will be sensing the same ring which it had just previously sensed. It does not want to count that ring a second time, and that is the purpose of setting the ring flag in the step 98. In the next several passes through the routine, affirmative results of the test 91 will redundantly perform the steps 96 and will have affirmative results of the test 97 so that the ring counter is not incremented in the steps 98. Instead, affirmative results of the test 97 cause the program of the master data processor 18 to revert to other routines through the return point 95. In other words, in successive passes through the routine of FIG. 4 during the same ring, essentially nothing happens.

Eventually, the ring will end, and so the step 91 will have a negative result in its first pass through an inter-ring space after sensing the first ring. A negative result of test 91 reaches the step 92 which resets the ring flag, signalling the end of the first ring. It then reaches a step 93 to see if an incoming call has been sensed. In this case it has because prior passes through the step 96 have set the incoming call latch. Therefore, an affirmative result of the test 93 will reach a test 100 to determine if the space flag is set or not. In the first pass following the end of the first ring, the space flag is not set because it had been reset in the steps 96. Therefore, a negative result of the test 100 will reach a pair of steps 101 which initiate a ring timer which is utilized to determine when there no longer is an incoming call. The timer is set to some period on the order of five seconds so that if it elapses without a ring occurring, it will be indicative of the fact that no more rings will be received. This either means that the phone has been answered and is in voice or data communication, or that the calling party has hung up. Once the ring timer has been initialized, it is not reinitialized until after a following ring occurs and ceases: this is assured by setting the space flag in the steps 101. Once the timer has been initiated and that fact has been recorded by the space flag, other parts of the programming of the master data processor 18 are reverted to through the return point 95.

Two hundred milliseconds later (or so), the routine is again reached, and the test 91 will again be negative so the step 92 will redundantly reset the ring flag and the test 93 will again determine if there still is an incoming call. For the first several passes between each ring, test 93 will be affirmative reaching the test 100. In this case, the space flag having previously been set, an affirmative result of test 100 causes the routine to veer away from initializing the ring timer and instead reaches a test 102 to determine if the ring timer has timed out or not. Initially it will not, so a negative result of test 102 will cause other parts of the program to be reverted to through the return point 95. Similarly, in subsequent passes of the program during an inter-ring space, an affirmative result of test 91 passes through step 92, and affirmative results of tests 93 and 100 will reach test 102. If no further rings appear, then eventually the ring timer may time out, so that in a pass through the routine of FIG. 4, an affirmative result of test 102 will reach a pair of steps 103 which will reset the incoming call latch (saying that there is no longer an incoming call waiting to be answered), and reset the ring counter which is described with respect to the steps 98 hereinbefore. Then, other programming is reached through the return point 95.

Thus, the routine of FIG. 4 will count the fact of a ring occurring during its first pass within a ring, and then ignore that ring until after the next space is sensed. It also determines that the presence of a ring means an incoming call, and lets the fact of an incoming call remain until a space occurs which exceeds the time out time of a ring timer, after which it terminates the recognition of an incoming call. The incoming call flag and the setting of the ring counter are used in tests 73 and 83 of FIG. 3, as described hereinbefore.

A typical utilization of the present invention includes use with a dedicated phone line, in which: the seize/share switch on (or associated with) the master data processor 18 or the equivalent, is set in the seize mode, the call configuration is established with starting and stopping times of zero; and the number of rings is set to one. But, the same system can also be set to share the telephone line with voice communications, in which phone calls at the master data processor 18 would be answered only between the hours of 1 am to 5 am, or such expanded time as desired, and only after several rings, thereby mitigating interference with incoming voice calls. And, in such case, only alarms would be transferred whenever the line is free, and all alerts that were not sent piggyback with alarms would be held until the wee hours of the morning for transmission to the local monitoring center 14. And, during periods of potential problems (fire, earthquakes), the line can be seized for alarms and alerts merely by transferring the share/seize switch (or equivalent) to the seize position, at the elevator site, without any change in the configuration of start and stop time or answer rings. However, it should be clear that the invention may be utilized in a wide range of configurations. For instance, the manifestation of the seize mode could be a signal provided by software, or could be a switch (or the like) used to bypass all software in making outgoing calls. Similarly, the protocol set herein can be adjusted to suit any implementation of the present invention, the numbers can be changed, the timing can be changed and various details and other features can be altered or added thereto. The present embodiment has been described as it relates to remote elevator monitoring systems, but it is obvious that it can be used in systems monitoring equipment other than elevators in a completely analogous fashion.

Since the characteristic of the phone line insofar as sharing it with voice communication or other purposes is a concern of the management of the building where the master data processor 18 is located, another embodiment of the invention may include utilizing the share/seize mode manifestation (as in the test 59, FIG. 3) also to bypass the answer rings and time of day limitations of steps and tests 79–83 to permit all incoming calls to go directly to the steps 86 (in a fashion which is analogous to the absolute seizure for outgoing calls as a consequence of the test 59.)

Thus, although the invention has been shown and described with respect to exemplary embodiments thereof, it should be understood by those skilled in the art that the foregoing and various other changes, omissions and additions may be made therein and thereto, without departing from the spirit and scope of the invention.

I claim:

1. A method of communicating over a telephone line between a pair of data processing systems having modems, comprising:

alternatively, either providing a seize mode manifestation indicative of the fact that the telephone line can be seized when busy for providing outgoing data messages or not providing said seize mode manifestation;

providing a start time signal indicative of the start of a time period in each day within which said telephone line may be accessed for data messages;

providing a stop time signal indicative of the time in each day when said time period stops;

providing data signals indicative of conditions in equipment associated with a first one of said data processing systems;

providing an alarm signal indicative of the fact that at least one condition indicated by said data signals relates to an emergency condition, the fact of which should be urgently transmitted over said telephone line; and transmitting said data signals over said telephone line alternatively, either: in the presence of said seize mode manifestation whether or not said telephone line is free; in the absence of said seize manifestation at a time of day which is between said start time and said stop time whether or not said telephone line is free; or in the absence of said seize mode manifestation when the time of day is not between said start time and said stop time, only in the event that said telephone line is free.

2. A method according to claim 1 comprising:

providing alert data signals indicative of conditions in said equipment which are less urgent than the conditions indicated by the presence of said alarm signal;

providing an alert signal indicative of the presence of said alert data signals; and alternatively, either: transmitting said alert data signals immediately in response to said seize mode manifestation, transmitting said alert data signals when the telephone line is free in the presence of said alert signal during said time period; or holding said alert data signals for transmission over the telephone line at a subsequent time within said time period in the event that said alert data signals and said alert signal are provided in the absence of said seize mode manifestation at a point in time outside of said time period.

3. A method according to claim 1 wherein said step of providing said stop time signal includes selectively providing a stop time signal equal to zero to signify that any time of day is deemed to be before said stop time.

4. A method according to claim 1 wherein said seize manifestation is provided at said first data processing system.

5. A method according to claim 1 wherein said start time signal and said stop time signal are provided at a second one of said data processing systems and transmitted over the telephone line to said first data processing system, the presence of which is to be utilized in said method at said first data processing system.

6. A method according to claim 1 comprising:

providing an answer rings signal indicative of a number of rings which must occur before a telephone call is to be answered; and answering a telephone call which occurs within said time period only after said number of rings indicated by said answer rings signal.

7. A method according to claim 6 wherein said answer ring signal is provided at a second one of said data processing systems and transmitted over the telephone line to said first data processing system, the presence of which is to be utilized in said method at said first data processing system.

* * * * *